United States Patent
Safai

(10) Patent No.: US 10,859,719 B2
(45) Date of Patent: Dec. 8, 2020

(54) ADJUSTABLE MULTIFACET X-RAY SENSOR ARRAY

(71) Applicant: The Boeing Company, Chicago, IL (US)

(72) Inventor: Morteza Safai, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 23 days.

(21) Appl. No.: 16/219,245

(22) Filed: Dec. 13, 2018

(65) Prior Publication Data

US 2020/0191983 A1 Jun. 18, 2020

(51) Int. Cl.
| | |
|---|---|
| *G01T 7/00* | (2006.01) |
| *G01N 23/04* | (2018.01) |
| *G01N 23/201* | (2018.01) |
| *G06T 1/00* | (2006.01) |
| *G01T 1/20* | (2006.01) |

(52) U.S. Cl.
CPC ............ *G01T 7/005* (2013.01); *G01N 23/04* (2013.01); *G01N 23/201* (2013.01); *G06T 1/0007* (2013.01); *G01T 1/20* (2013.01); *G06T 2207/10116* (2013.01)

(58) Field of Classification Search
CPC ........... G01T 7/005; G01T 1/20; G01N 23/04; G01N 23/201; G06T 1/0007; G06T 2207/10116
See application file for complete search history.

(56) References Cited

U.S. PATENT DOCUMENTS

| | | | | |
|---|---|---|---|---|
| 6,424,695 | B1 * | 7/2002 | Grodzins | G01N 23/04 378/87 |
| 2005/0189494 | A1 * | 9/2005 | Conwell | G01T 1/1611 250/363.04 |
| 2008/0230706 | A1 * | 9/2008 | Dorscheid | A61B 6/4291 250/363.05 |
| 2012/0014506 | A1 * | 1/2012 | Lee | G03B 35/04 378/41 |
| 2012/0039439 | A1 * | 2/2012 | Kia | A61B 6/03 378/62 |

(Continued)

FOREIGN PATENT DOCUMENTS

| | | |
|---|---|---|
| WO | 2016123688 | 8/2016 |
| WO | 2017202738 | 11/2017 |

OTHER PUBLICATIONS

Morgan, Kelsey M., Hot Science with Cool Sensors, Physics Today, Aug. 2018, pp. 29-34, vol. 71, accessed from https://doi.org/10.1063/PT.3.3995 on Dec. 13, 2018.

(Continued)

*Primary Examiner* — Blake C Riddick
(74) *Attorney, Agent, or Firm* — Kunzler Bean & Adamson

(57) ABSTRACT

Disclosed herein is a system for x-ray inspection. The system comprises an x-ray emitter. The system also comprises an x-ray sensor array comprising a first x-ray sensor, a second x-ray sensor adjacent the first x-ray sensor, and a coupler movably coupling the first x-ray sensor to the second x-ray sensor. The first x-ray sensor is movable into a plurality of orientations relative to the second x-ray sensor via the coupler. The system further comprises an imaging device to generate an inspection image based on information from the x-ray sensor array.

20 Claims, 6 Drawing Sheets

(56) References Cited

U.S. PATENT DOCUMENTS

| | | | |
|---|---|---|---|
| 2013/0044928 A1* | 2/2013 | Vincent | G06T 7/344 |
| | | | 382/131 |
| 2013/0315376 A1 | 11/2013 | Safai | |
| 2015/0078525 A1* | 3/2015 | Hofmann | H01L 27/14636 |
| | | | 378/62 |
| 2015/0192510 A1* | 7/2015 | Piestun | G01B 11/002 |
| | | | 702/151 |
| 2016/0070006 A1 | 3/2016 | Konkle et al. | |
| 2018/0017684 A1* | 1/2018 | Delodder | G01N 23/04 |
| 2018/0356352 A1* | 12/2018 | Pipino | G01V 5/0016 |
| 2019/0120977 A1* | 4/2019 | Jacobs | G01T 1/2018 |

OTHER PUBLICATIONS

Extended European Search Report concerning EP Patent Application No. 19212624.1 dated May 12, 2020.

\* cited by examiner

ADJUSTABLE MULTIFACET X-RAY SENSOR ARRAY

FIELD

This disclosure relates generally to x-ray inspection, and more particularly to apparatuses, systems, and methods for adjustably detecting x-rays.

BACKGROUND

Some inspection techniques, such as non-destructive testing, foreign object detection, non-line-of-site examination, etc., are employed when destruction of a part to be inspected is not desirable. Certain x-ray inspection techniques provide a penetrating scan or examination of a part. Such x-ray inspection techniques are used in a variety of applications, such as homeland security, oil and gas mining and refining, pipeline inspection, transportation, automotive, aerospace, marine, mining, shipping, and storage, among others.

Some x-ray inspection techniques utilize the detection of x-rays that pass through a part, from one side of the part to the opposite side of the part. In other inspection techniques, such as x-ray backscattering techniques, the x-rays reflected back from the part (e.g., backscattered x-rays) are detected and then used to produce images or an analysis of the part. The pattern and intensity of the x-rays depends upon the materials and organization of the part. Accordingly, the pattern and intensity of the detected x-rays can be used to generate an image, which is relied upon to determine a quality, characteristic, or anomaly of the part.

SUMMARY

The subject matter of the present application has been developed in response to the present state of the art, and in particular, in response to the shortcomings of traditional x-ray inspection devices, that have not yet been fully solved by currently available techniques. Accordingly, the subject matter of the present application has been developed to provide an adjustable multifacet x-ray sensor array, and associated apparatuses, systems, and methods, that overcomes at least some of the shortcomings of prior art techniques.

Disclosed herein is a system for x-ray inspection. The system comprises an x-ray emitter. The system also comprises an x-ray sensor array comprising a first x-ray sensor, a second x-ray sensor adjacent the first x-ray sensor, and a coupler movably coupling the first x-ray sensor to the second x-ray sensor. The first x-ray sensor is movable into a plurality of orientations relative to the second x-ray sensor via the coupler. The system further comprises an imaging device to generate an inspection image based on information from the x-ray sensor array. The preceding subject matter of this paragraph characterizes example 1 of the present disclosure.

The x-ray sensor array is configured to detect backscattered x-rays. The preceding subject matter of this paragraph characterizes example 2 of the present disclosure, wherein example 2 also includes the subject matter according to example 1, above.

The x-ray sensor array is configured to detect pass-through x-rays. The preceding subject matter of this paragraph characterizes example 3 of the present disclosure, wherein example 3 also includes the subject matter according to any one of examples 1-2, above.

The second x-ray sensor is adjustable, via the coupler, relative to the first x-ray sensor along a first dimension. The x-ray sensor array further comprises a third x-ray sensor that is adjustable, via a second coupler movably coupling the first x-ray sensor and the third x-ray sensor, relative to the first x-ray sensor along a second dimension offset from the first dimension. The preceding subject matter of this paragraph characterizes example 4 of the present disclosure, wherein example 4 also includes the subject matter according to any one of examples 1-3, above.

The x-ray sensor array is adjustable in three dimensions. The preceding subject matter of this paragraph characterizes example 5 of the present disclosure, wherein example 5 also includes the subject matter according to example 4, above.

At least one of the first x-ray sensor or the second x-ray sensor comprises a transition-edge sensor. The preceding subject matter of this paragraph characterizes example 6 of the present disclosure, wherein example 6 also includes the subject matter according to any one of examples 1-5, above.

At least one of the first x-ray sensor and the second x-ray sensor comprises a superconductor material. The preceding subject matter of this paragraph characterizes example 7 of the present disclosure, wherein example 7 also includes the subject matter according to example 6, above.

At least one of the first x-ray sensor or the second x-ray sensor comprises a scintillator layer. The preceding subject matter of this paragraph characterizes example 8 of the present disclosure, wherein example 8 also includes the subject matter according to any one of examples 1-7, above.

The x-ray emitter is configured to raster emitted x-rays. The preceding subject matter of this paragraph characterizes example 9 of the present disclosure, wherein example 9 also includes the subject matter according to any one of examples 1-8, above.

The coupler is manually adjustable. The preceding subject matter of this paragraph characterizes example 10 of the present disclosure, wherein example 10 also includes the subject matter according to any one of examples 1-9, above.

The coupler is automatically adjustable in response to a geometry of a target structure. The preceding subject matter of this paragraph characterizes example 11 of the present disclosure, wherein example 11 also includes the subject matter according to any one of examples 1-9, above.

Further disclosed herein is a method of x-ray inspection. The method comprises positioning an x-ray emitter relative to a target structure. The method further comprises shaping an x-ray sensor array, comprising a plurality of movably interconnected x-ray sensors, to complement a shape of the target structure. The method additionally comprises detecting x-rays from the target structure at the x-ray sensor array. The method also comprises generating an inspection image of the target structure based on information from the x-ray sensor array. The preceding subject matter of this paragraph characterizes example 12 of the present disclosure.

The method further comprises reshaping the x-ray sensor array in response to a change in the shape of the target structure. The preceding subject matter of this paragraph characterizes example 13 of the present disclosure, wherein example 13 also includes the subject matter according to example 12, above.

The method also comprises detecting the shape of the target structure. The preceding subject matter of this paragraph characterizes example 14 of the present disclosure, wherein example 14 also includes the subject matter according to any one of examples 12-13, above.

The method additionally comprises identifying a condition of the target structure based on the inspection image.

The preceding subject matter of this paragraph characterizes example 15 of the present disclosure, wherein example 15 also includes the subject matter according to any one of examples 12-14, above.

Shaping the x-ray sensor array comprises orienting the plurality of x-ray sensors in a first dimension. The preceding subject matter of this paragraph characterizes example 16 of the present disclosure, wherein example 16 also includes the subject matter according to any one of examples 12-15, above.

Shaping the x-ray sensor array comprises orienting the plurality of x-ray sensors in a first dimension and a second dimension. The preceding subject matter of this paragraph characterizes example 17 of the present disclosure, wherein example 17 also includes the subject matter according to any one of examples 12-16, above.

Also disclosed herein is an x-ray sensor array. The x-ray sensor array comprises a first x-ray sensor, a second x-ray sensor adjacent the first x-ray sensor, and a coupler movably coupling the first x-ray sensor to the second x-ray sensor. The first x-ray sensor is movable into a plurality of orientations relative to the second x-ray sensor via the coupler. The preceding subject matter of this paragraph characterizes example 18 of the present disclosure.

The x-ray sensor array further comprises an aperture to allow x-rays to be emitted through the x-ray sensor array towards a target structure. The preceding subject matter of this paragraph characterizes example 19 of the present disclosure, wherein example 19 also includes the subject matter according to example 18, above.

The first x-ray sensor and the second x-ray sensor are superconductor transition-edge sensors. The preceding subject matter of this paragraph characterizes example 20 of the present disclosure, wherein example 20 also includes the subject matter according to any one of examples 18-19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1A:
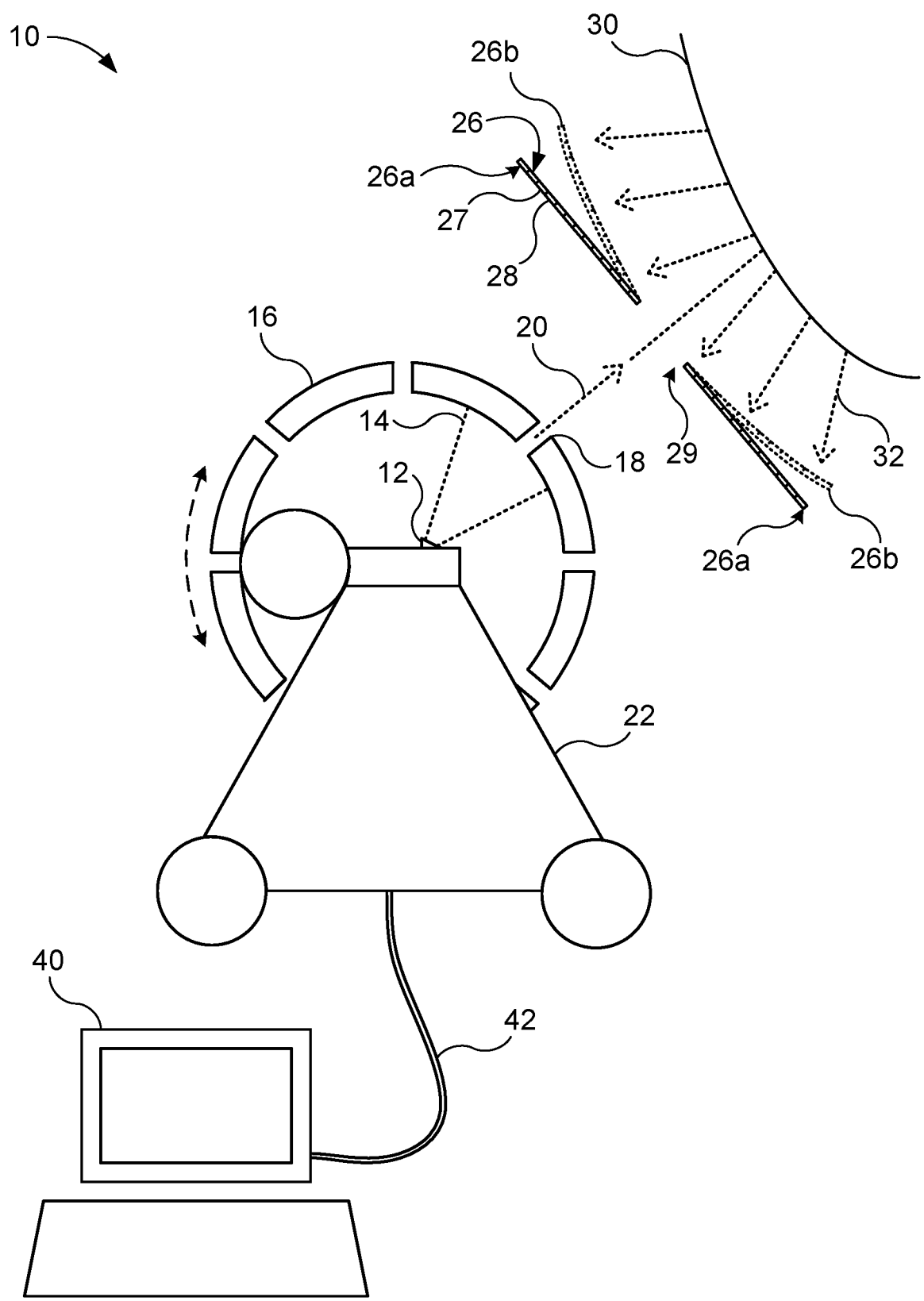
FIG. 1A is an elevation view of a system for x-ray inspection, according to one or more examples of the present disclosure.

Referring to FIG. 1A, a system 10 for x-ray inspection is shown. The system 10 includes an x-ray emitter 12, an x-ray sensor array 26 (shown in positions 26a and 26b), and an imaging system 40. In the illustrated example, the x-ray emitter 12 is coupled to a base 22. The x-ray emitter 12 generates an incident x-ray emission 14 and projects the incident x-ray emission 14 onto an inspection filter 16 proximate a filter aperture 18 of the inspection filter 16. A portion (i.e., a filtered x-ray emission 20) of the incident x-ray emission 14 passes through the filter aperture 18. The filtered x-ray emission 20 impinges on a target structure 30. As the filter 16 is rotated, the filtered x-ray emission 20 may be rastered along the target structure 30.

As shown, the system 10 may be configured to detect x-rays in a backscattering arrangement. In this arrangement, the filtered x-ray emission 20 may pass alongside or through the x-ray sensor array 26. For example, the x-ray sensor array 26 may include an array aperture 29 to allow the filtered x-ray emission 20 to pass through the x-ray sensor array 26. The filtered x-ray emission 20 is then at least partially reflected (reflected x-rays 32) by the target structure 30 back towards the x-ray sensor array 26. The reflected x-rays 32 are detected at the x-ray sensor array 26. The x-ray sensor array 26 is a multifacet array in that it has a plurality of individual x-ray sensors (including, for example, a first x-ray sensor 27 and a second x-ray sensor 28) each with a corresponding orientation or direction of facing. The second x-ray sensor 28 is movable (e.g., reorientable) relative to the first x-ray sensor 27. The x-ray sensor array 26 also includes a coupling (shown in FIGS. 3A and 3B) to link the first x-ray sensor 27 and the second x-ray sensor 28 to form the x-ray sensor array 26. The second x-ray sensor 28 has an orientation that is adjustable with respect to the first x-ray sensor 27 and other x-ray sensors of the x-ray sensor array 26. This adjustability allows the x-ray sensor array 26 to be spatially configured (e.g. reshaped) to match a shape or other characteristic of a target structure 30. For example, the target structure 30 of FIG. 1A has a convex geometry.

By spatially configuring the x-ray sensor array 26 from a planar position 26a (or convex position) to a concave position 26b corresponding to the target structure 30, the x-ray sensor array 27 is able to detect reflected x-rays 32 more efficiently than if the array was not complementary shaped relative to the target structure 30. More specifically, the ability to reshape the x-ray sensor array 26 to any of various shapes, complementing any of various shapes of a target structure, the system 10 uses less energy, generates imaging with higher resolution and contrast, promotes decreased signal-noise ratio, has a decreased size, weight, and cost of the system 10, and allows the system 10 be used in a broader range of inspection applications. In some examples, the adjustment of the x-ray sensor array 26 is done manually via use of a tool or by hand. In other examples, the system 10 may include a drive system (not shown) that modifies the geometry of the x-ray sensor array 26. In some examples, the drive system may communicate with a scanner, a location-based sensor, or the like to determine a structural characteristic of the target structure 30 where the system 10 will be inspecting the target structure 30. The structural characteristic may include the structural geometry of the target structure, an orientation of the target structure, a predicted corrosion, delamination, degradation, deposit, or the like, a material composition of the target structure, a setting of the x-ray emitter 12 or other component of the system 10, or another variable. In some examples, a first image may be taken of the target structure 30 with the system 10 and adjustments to the spatial configuration of the x-ray sensor array 26 may be determined based on the first image. Other criteria for adjusting the x-rays sensor array 26 may also be used.

The system 10 also includes an imaging device 40 to generate an inspection image based on information from the x-ray sensor array 26. In some examples, the imaging device 40 interprets the information to generate an image or other inspection results. In some examples, the imaging device 40 also provides signals to control the generation of x-rays by the x-ray emitter 12, movement of the inspection filter 16, movement of the base 22 relative to the target structure 30, movement of the x-ray sensor array 26, control of a cooling system or power source, or monitoring of a system or individual component state via sensors or other devices. The imaging device 40 includes a connection 42 to carry information. The connection 42 may be a wired or wireless connection. In the depicted implementation, the imaging device 40 is a separate component. Alternatively, the imaging device 40 is integrated with the base 22 or another portion of the system 10.

Figure 1B:
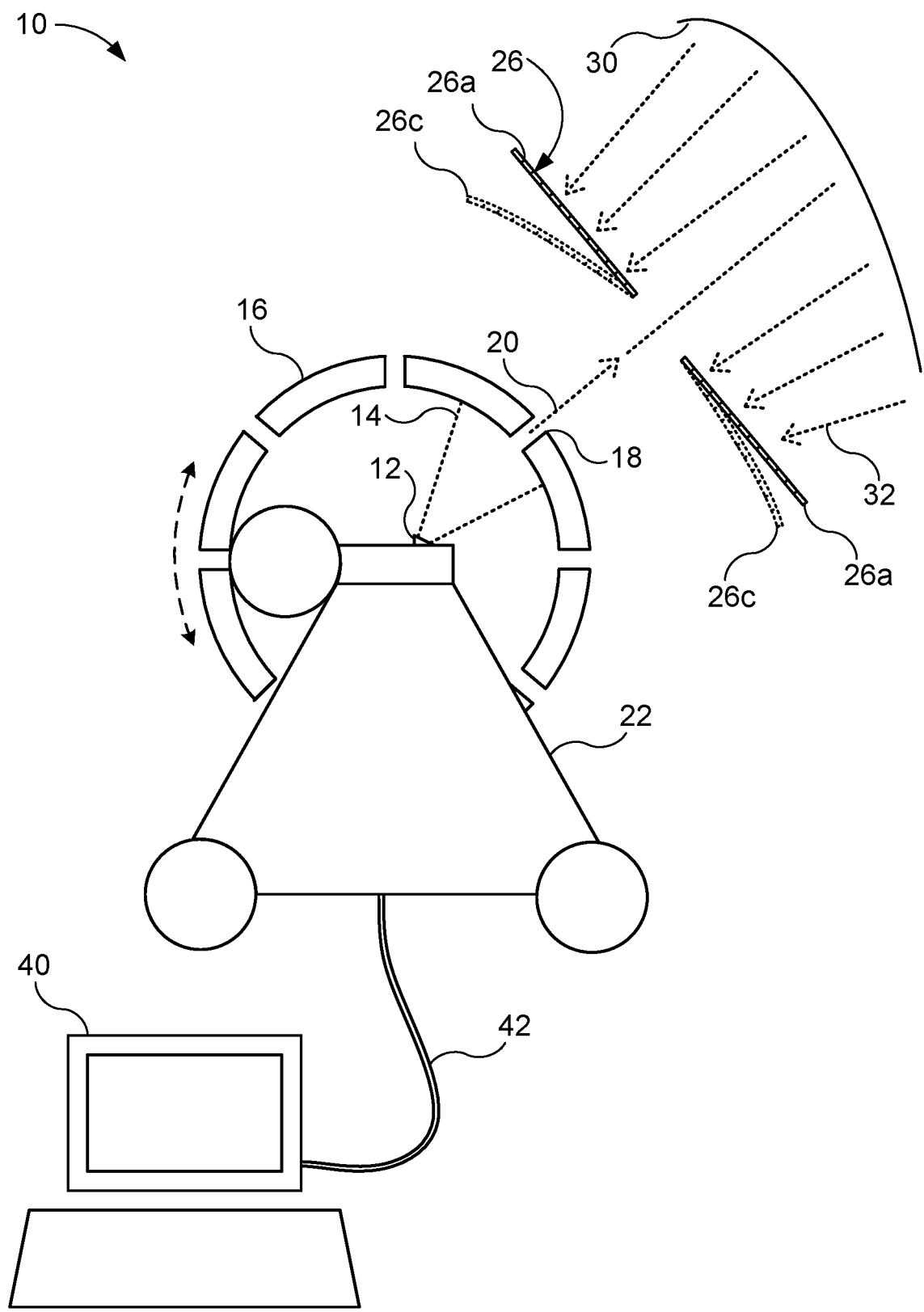
FIG. 1B is an elevation view of the system of FIG. 1A for x-ray inspection of a target structure that is concave, according to one or more examples of the present disclosure.
Figure 1C:
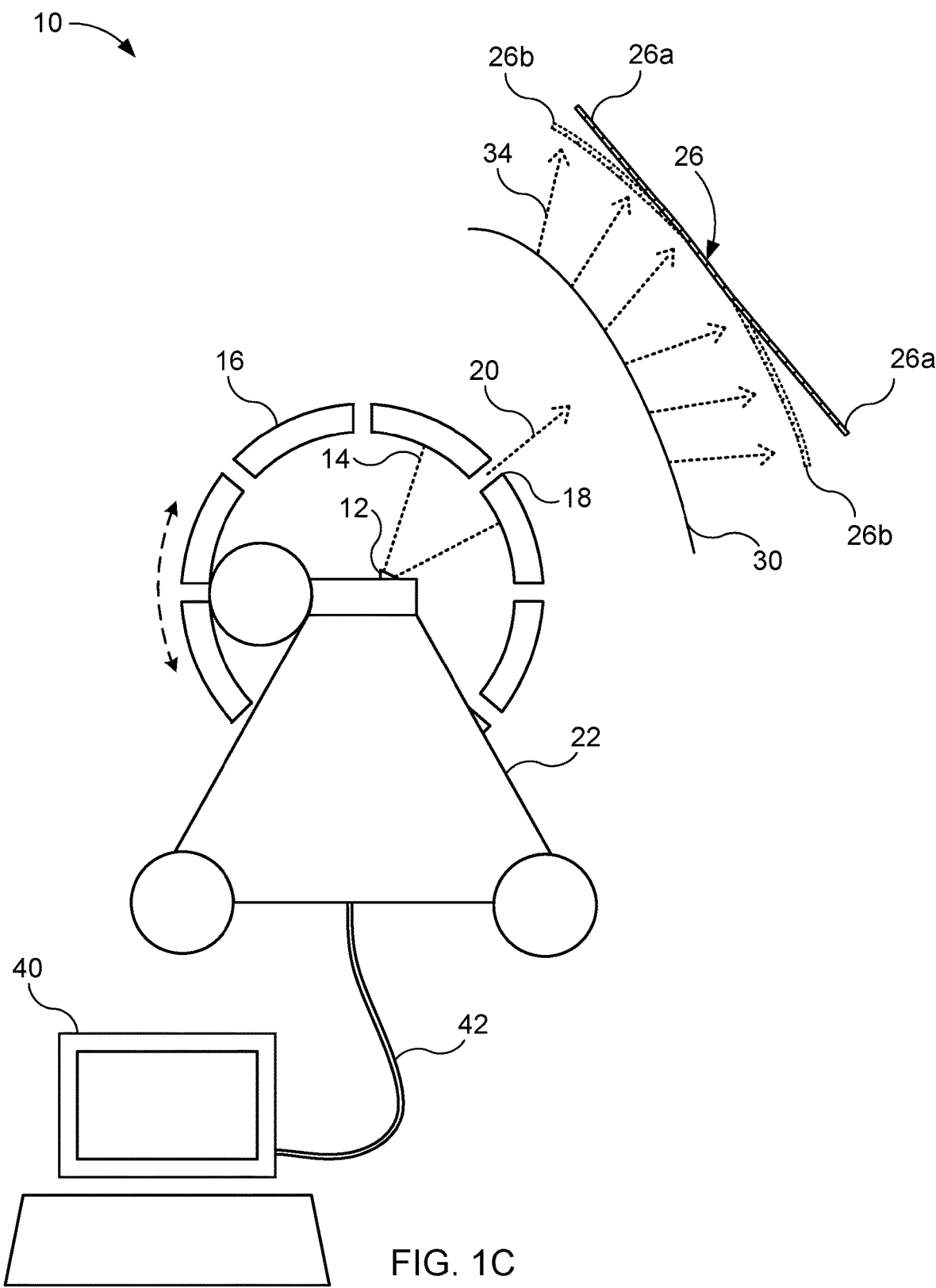
FIG. 1C is an elevation view of the system of FIG. 1A for x-ray inspection with pass-through x-rays, according to one or more examples of the present disclosure.

Referring to FIG. 1B, the x-ray sensor array 26 may be configured to a convex spatial configuration to correspond to the target structure 30 having a concave geometry. FIG. 1C illustrates another example in which the x-ray sensor array 26 is positioned on a side of the target structure 30 opposite the x-ray emitter 12 to receive pass-through x-rays 34. In this example, the array aperture 29 may be omitted as x-rays do not need to pass through the x-ray sensor array 26 to reach the target structure 30.

Figure 2:
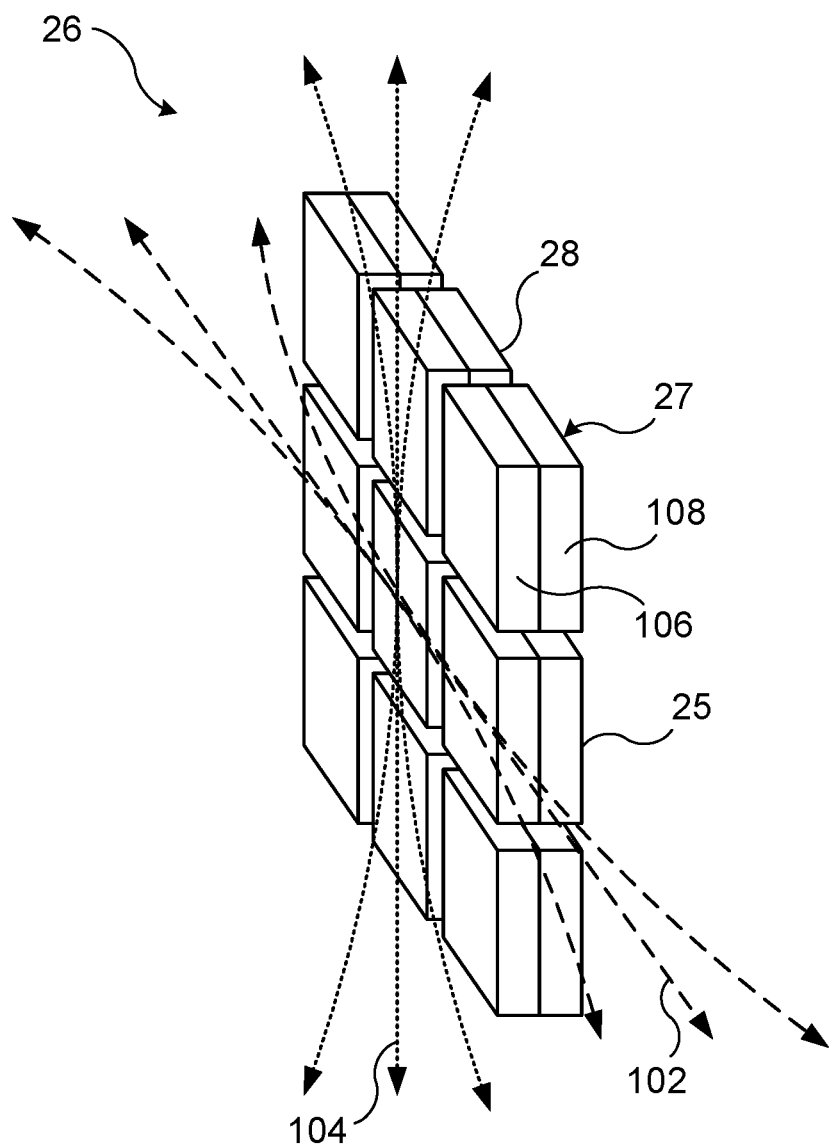
FIG. 2 is a perspective view of an apparatus for x-ray detection, according to one or more examples of the present disclosure.

As shown in FIG. 2, the x-ray sensor array 26 includes a plurality of x-ray sensors (the first x-ray sensor 27, the second x-ray sensor 28, and a third x-ray sensor 25). Each of the plurality of sensors in the x-ray sensor array 26 may have an orientation that is adjustable relative to the orientation of another of the plurality of sensors. For example, the second x-ray sensor 28 may have a relative orientation adjustable with respect to the orientation of the first x-ray sensor 27. The adjustability may be along at least one of a first dimension 102 or a second dimension 104. The first dimension 102 and the second dimension 104 are offset from one another. For example, the first dimension 102 and the second dimension 104 may be oriented perpendicular to one another. One or more of the first dimension 102 and the second dimension 104 may allow for adjustability to form a concave, convex, or other compound geometry. In the illustrated example, the second x-ray sensor 28 may be adjusted relative to the first x-ray sensor 27 along the first dimension 102 and the third x-ray sensor 25 may have a relative orientation adjusted with respect to the first x-ray sensor 27 along the second dimension 104.

While nine sensors are shown in FIG. 2, the number of sensors used may vary from two to hundreds or thousands or more. Additionally, the size and shape of the x-ray sensor array 26 may vary. Furthermore, the size and shape of the individual sensors may vary. For example, the size of one or more of the first x-ray sensor 27 and the second x-ray sensor may be approximately one-hundred microns by one-hundred microns. In another example, the sensors may be three-hundred-fifty microns square.

At least one of the first x-ray sensor 27, the second x-ray sensor 28, or any other sensor of the x-ray sensor array 26 is a microelectromechanical (MEM) sensor, such as a transition-edge sensor (TES) in some examples. TES technology may provide improved efficiency and bandwidth similar to that of a solid-state detector while also incorporating improved resolution similar to that of eV-scale technology. TES technology can be useful in detecting chemical shifts and providing detection in situations where the incident energy is relatively weak. The relatively broad spectral coverage of TES sensors allow for simultaneous sampling of multiple emission K lines. TES technology also allows for grouping of multiple sensors into the x-ray sensor array 26. Combining TES sensors with the configurability of the shape of the x-ray sensor array 26 facilitates imaging of non-flat structures to reduce imaging issues such as low resolution, pin-cushioning, shadowing, aberration, and the like.

Additionally, one or more of the first x-ray sensor 27, the second x-ray sensor 28, or any other sensor of the x-ray sensor array 26 incorporate one or more superconductor materials in some examples. Furthermore, in the illustrated example, each sensor includes a scintillator layer 106 applied to a sensor body 108. The scintillator layer 106 may be included or omitted. The scintillator layer 106 is an organic or inorganic scintillator material in some examples. While each sensor of the x-ray sensor array 26 is shown as rectangular, other shapes and geometries may be used. Additionally, one or more of the x-ray sensors is different from another in the x-ray sensor array 26 in some examples.

Figure 3A:
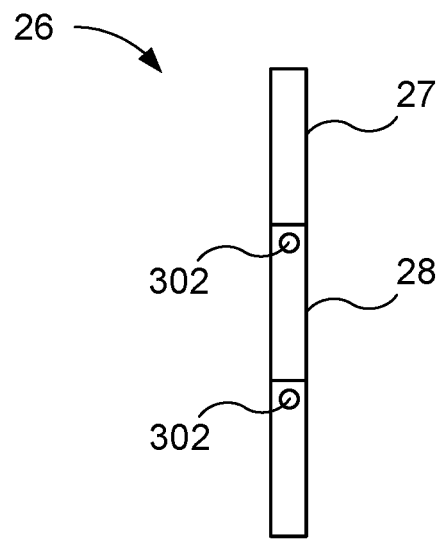
FIG. 3A is a side view of the apparatus of FIG. 2 with pinned couplers, according to one or more examples of the present disclosure.

Referring now to FIG. 3A, the first x-ray sensor 27 and the second x-ray sensor 28 of the x-ray sensor array 26 are linked by a coupler 302. In the illustrated example, the coupler 302 is a pinned coupler. The pinned coupler 302 may allow for relative orientation adjustment of the first x-ray sensor 27 relative to the second x-ray sensor 28 in one or more dimensions. For example, the pinned form of the coupler 302 allows for a single curvature to be formed by the x-ray sensor array 26. In another example, the pinned coupler 302 allows for a compound curve to be formed which may result in a dish-shaped, dome-shaped, saddle-shaped, or more complex geometries with one or more different regions formed by the x-ray sensor array 26. In some examples, the coupler 302 allows for expansion or reduction in the size of the x-ray sensor array 26 via addition or removal of individual sensors. Additionally, sensors or different types (for example different scintillators, coatings, layers, or the like) are used in different regions or locations of the x-ray sensor array 26 in certain examples.

Figure 3B:
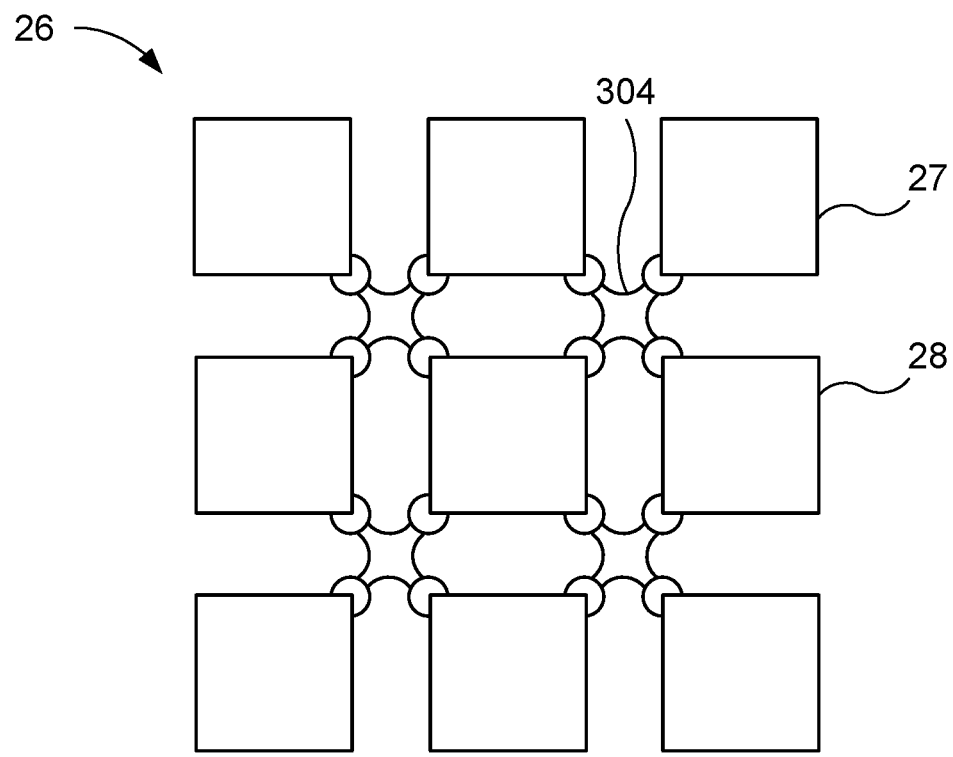
FIG. 3B is a front view of the apparatus of FIG. 2 with ball couplers, according to one or more examples of the present disclosure.

Referring to FIG. 3B, a ball coupler 304 is shown. The ball coupler 304 allows for relative orientation adjustment of the first x-ray sensor 27 and the second x-ray sensor 28. The ball coupler 304 may be rigid or flexible or may include both rigid and flexible portions. In some examples, the ball coupler 304 allows for rigid ball-and-socket type motion while a portion of the ball coupler 304 is flexible to allow one or more additional degrees of freedom. In some examples, the couplers 304 (or 302) facilitate collapsing of the x-ray sensor array 26 to reduce size for transportation or storage or to protect the x-ray sensor array 26.

Figure 4:
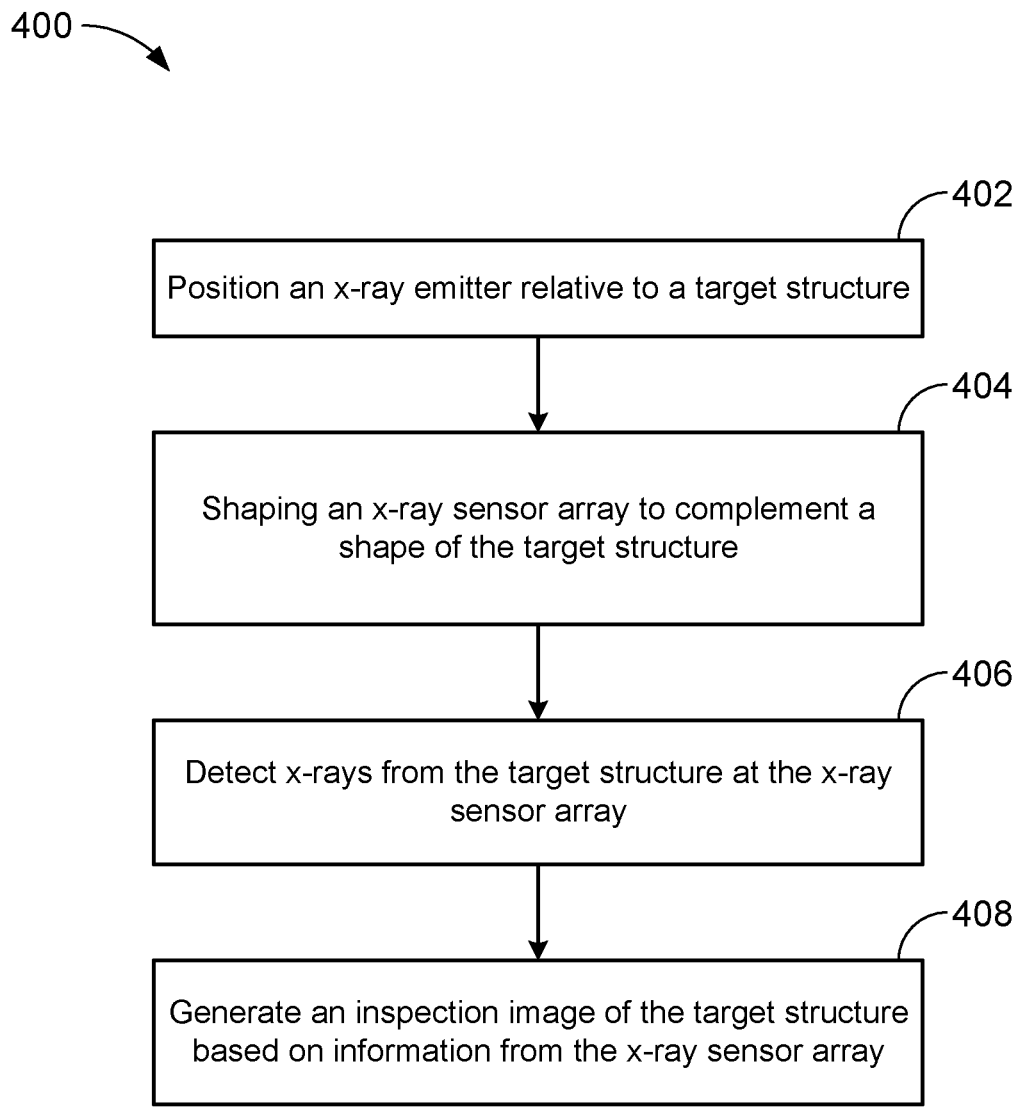
FIG. 4 is a flow diagram of a method of x-ray inspection, according to one or more examples of the present disclosure.

Referring to FIG. 4, a method 400 of x-ray inspection is shown. The method 400 includes positioning an x-ray emitter relative to a target structure, at 402. Additionally, the method 400 includes shaping (e.g., spatially configuring) an x-ray sensor array, comprising a plurality of x-ray sensors, to complement a shape (e.g., a structural configuration) of the target structure, at 404. The method 400 also includes detecting x-rays from the target structure at the x-ray sensor array, at 406. The method 400 further includes generating an inspection image of the target structure based on information from the x-ray sensor array, at 408.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A system for x-ray inspection, the system comprising:
    an x-ray emitter;
    an x-ray sensor array comprising:
        a first x-ray sensor;
        a second x-ray sensor adjacent the first x-ray sensor; and
        a coupler positioned interstitial to the first x-ray sensor and the second x-ray sensor and movably coupling the first x-ray sensor to the second x-ray sensor, wherein the first x-ray sensor is movable into a plurality of orientations relative to the second x-ray sensor via the coupler; and
    an imaging device to generate an inspection image based on information from the x-ray sensor array;

wherein the second x-ray sensor is adjustable, via the coupler, relative to the first x-ray sensor along a first dimension and the x-ray sensor array further comprises a third x-ray sensor that is adjustable, via the coupler, which movably couples the first x-ray sensor and the third x-ray sensor, relative to the first x-ray sensor along a second dimension offset from the first dimension.

2. The system of claim 1, wherein the x-ray sensor array is configured to detect backscattered x-rays.

3. The system of claim 1, wherein the x-ray sensor array is configured to detect pass-through x-rays.

4. The system of claim 1, wherein the x-ray sensor array is adjustable in three dimensions.

5. The system of claim 1, wherein at least one of the first x-ray sensor or the second x-ray sensor comprises a transition-edge sensor.

6. The system of claim 5, wherein at least one of the first x-ray sensor and the second x-ray sensor comprises a superconductor material.

7. The system of claim 1, wherein at least one of the first x-ray sensor or the second x-ray sensor comprises a scintillator layer.

8. The system of claim 1, wherein the x-ray emitter is configured to raster emitted x-rays.

9. The system of claim 1, wherein the coupler is manually adjustable.

10. The system of claim 1, wherein the coupler is automatically adjustable in response to a geometry of a target structure.

11. A method of x-ray inspection, the method comprising:
positioning an x-ray emitter relative to a target structure;
shaping an x-ray sensor array, comprising articulating a first x-ray sensor relative to a second x-ray sensor along a first dimension via a coupler movably coupling the first x-ray sensor to the second x-ray sensor and positioned interstitial to the first x-ray sensor and the second x-ray sensor and articulating the first x-ray sensor relative to a third x-ray sensor along a second dimension, which is offset from the first dimension, via the coupler, which movably couples the first x-ray sensor to the third x-ray sensor and is positioned interstitial to the first x-ray sensor and the third x-ray sensor, to complement a shape of the target structure;
detecting x-rays from the target structure at the x-ray sensor array; and
generating an inspection image of the target structure based on information from the x-ray sensor array.

12. The method of claim 11, further comprising reshaping the x-ray sensor array in response to a change in the shape of the target structure.

13. The method of claim 11, further comprising detecting the shape of the target structure.

14. The method of claim 11, further comprising identifying a condition of the target structure based on the inspection image.

15. An x-ray sensor array, the x-ray sensor array comprising:
a first x-ray sensor;
a second x-ray sensor adjacent the first x-ray sensor; and
a coupler positioned interstitial to the first x-ray sensor and the second x-ray sensor and movably coupling the first x-ray sensor to the second x-ray sensor, wherein the first x-ray sensor is movable into a plurality of orientations relative to the second x-ray sensor via the coupler;
wherein the second x-ray sensor is adjustable, via the coupler, relative to the first x-ray sensor along a first dimension and the x-ray sensor array further comprises a third x-ray sensor that is adjustable, via the coupler, which movably couples the first x-ray sensor and the third x-ray sensor, relative to the first x-ray sensor along a second dimension offset from the first dimension.

16. The x-ray sensor array of claim 15, further comprising an aperture to allow x-rays to be emitted through the x-ray sensor array towards a target structure.

17. The x-ray sensor array of claim 15, wherein the first x-ray sensor and the second x-ray sensor are superconductor transition-edge sensors.

18. The x-ray sensor array of claim 15, wherein the x-ray sensor array is configured to detect backscattered x-rays.

19. The x-ray sensor array of claim 15, wherein the x-ray sensor array is configured to detect pass-through x-rays.

20. The x-ray sensor array of claim 15, wherein at least one of the first x-ray sensor or the second x-ray sensor comprises a scintillator layer.

* * * * *